Patented Mar. 22, 1938

2,111,882

UNITED STATES PATENT OFFICE 2,111,882

METHOD OF SULPHURIZING TERPENES, ABIETYL COMPOUNDS, ETC.

Joseph N. Borglin, Wilmington, Del., assignor to Hercules Powder Company, Wilmington, Del., a corporation of Delaware No Drawing. Application May 1, 1934, Serial No. 723,329

22 Claims. (Cl. 260—17)

This invention relates to an improved method for sulphurizing organic compounds such as, for example, lard oil, cottonseed oil, petroleum lubricating oil, etc., and more particularly to a method for sulphurizing naval stores products, i. e. products obtained from the southern pine and derivatives thereof, such as pine oil, turpentine, dipolymer, rosin, rosin esters, etc., or their chemical constituents as various terpenes, for example, terpineol, anethol, pinene, dipentene, terpinolene, terpinene, di- and poly-terpenes, etc., and abietyl compounds, for example, abietic acid, alkyl abietates, abietyl alcohol, etc.

The term "sulphurizing" as used in this art designates the process of combining a substance with elemental sulphur. This combination is effected by heating the organic compound, e. g. a naval stores product, such as pine oil, with the desired quantity of sulphur, or with equivalent amounts of sulphur compounds which readily give up elemental sulphur under the conditions of the reaction. Such processes involving the use of various naval stores products and the resultant products are described in U. S. Patent No. 1,844,400 to W. H. Kobbé and U. S. Patent No. 1,926,687 to R. C. Palmer and P. O. Powers. Any organic compound which contains unsaturated linkages and/or replaceable hydrogen may be sulphurized by similar procedures.

The products produced by the methods described in these patents, while useful for certain purposes, are nevertheless unsuited for many uses to which they might otherwise be adapted by reason of their extremely dark color, which in most cases is almost jet black.

It has been discovered in accordance with this invention that sulphurized organic compounds may be produced which are very light in color and are accordingly adapted for many uses for which the previously known products are unsuitable.

Accordingly, the method in accordance with this invention is directed to the production of sulphurized organic compounds, such as, lard oil, cottonseed oil, petroleum lubricating oil, etc., various naval stores products, such as, pine oil, turpentine, dipolymer, rosin, rosin esters, etc., or their chemical constituents as, various terpenes, for example, terpineol, anethol, pinene, dipentene, terpinolene, terpinene, di- and poly-terpenes, etc., and abietyl compounds, for example, abietic acid, alkyl abietates, abietyl alcohol, etc. having a very light color. The method in accordance with this invention involves broadly the sulphurization of the organic compound in the absence of air or other oxidizing agents. More particularly, the method as applied to naval stores products may involve the purification of the naval stores product by the removal of oxidized components therefrom followed by the sulphurization of the purified material in the absence of air or other oxidizing agents.

The purification, if desired, of the naval stores products to be sulphurized may readily be effected by distillation, preferably preceded, where hydrocarbons such as pinene, dipentene, terpinolene, terpinene, etc., and their polymers, are to be sulphurized, by washing with aqueous caustic solution. The distillation of these hydrocarbons will also be preferably conducted in the presence of alkali, with or without the use of steam in the distillation procedure. When the boiling point of the material to be purified is high, the distillation will desirably be conducted under reduced pressure. The distillation may also be conducted in an atmosphere of inert gas to prevent oxidation during the distillation. Of course, in some cases the naval stores products to be sulphurized, having been freshly prepared or distilled, will not contain oxidized bodies and hence will not need to be further purified before sulphurization.

The sulphurization of the organic compound, as, for example, a purified naval stores product, will be conducted in the presence of an inert gas such as, for example, carbon dioxide, nitrogen, etc. A temperature of from 80 to about 200° C. may be employed for sulphurization, and if desired the reaction may be carried out at superatmospheric pressure. Desirably, however, the temperature of sulphurization will be kept below about 140° C. in order to avoid substantial formation of hydrogen sulphide. Sulphur will be used in amount from about 1% to 35% by weight of the naval stores product, and the heating will be carried out for a period of from 1 to 80 hours.

The following examples are illustrative of the practical embodiment of the method in accordance with this invention:

Example I

A dark-colored dipolymer (a diterpene) made by dehydration of pine oil with fuller's earth is washed thoroughly with a 10% aqueous caustic soda solution, separated from this solution, and distilled under reduced pressure (1–30 mm. Hg). Distillation is stopped when about 75–85% has distilled over, and the distillate is then heated with 10–12% by weight of sulphur at 120–130° C. for about twenty hours. During the entire heating period the reactants are blanketed with carbon dioxide gas to prevent oxidation. Carbon dioxide gas is also passed through the cooling reaction product after the reaction is complete to aid in the removal of any slight amount of $H_2S$ which may have been formed. The product is a light colored liquid with a slight greenish tinge, and contains about 10-12% sulphur.

*Example II*

300 parts by weight of a pine oil, purified by steam distillation from caustic soda solution, is heated with 30 parts of sulphur for sixteen hours at 130° C. in an atmosphere of carbon dioxide. The product is a light-brown liquid.

*Example III*

180 g. of freshly distilled methyl abietate and 20 g. of sulphur are heated for 48 hours at 130° C. in an atmosphere of carbon dioxide. A light colored product is obtained.

*Example IV*

180 g. of I wood rosin and 20 g. of sulphur were heated 50 hours at 130° C. in an atmosphere of carbon dioxide. A light-colored product is obtained.

*Example V*

85 parts by weight of a commercial grade of lard oil and 15 parts by weight of sulphur were heated twenty-four hours at a temperature of 130-140° C., in an atmosphere of carbon dioxide. The resulting product was lighter in color than a product similarly sulphurized in the presence of air.

*Example VI*

15 parts by weight of sulphur and 185 parts by weight of petroleum lubricating oil were heated thirty-six hours in an atmosphere of carbon dioxide at 130-140° C. The resulting product was lighter in color than a product similarly sulphurized in the presence of air.

*Example VII*

170 parts by weight of refined cottonseed oil and 30 parts by weight of sulphur were heated to reaction at 130-140° C., in an atmosphere of nitrogen gas. The resulting product was lighter in color than when sulphurized in the presence of air.

*Example VIII*

300 parts by weight of turpentine purified by steam distillation from alkali solution, 1700 parts by weight of alkali washed and distilled dipolymer and 500 parts by weight of sulphur were heated forty-eight hours at 130-140° C. in an atmosphere of carbon dioxide. The reaction was then complete. This product contained 20-22% sulphur and was much lighter in color than a product similarly sulphurized in the presence of air.

The products of the method in accordance with this invention will be characterized by a much lighter color than similar products heretofore prepared and will be resistant to further discoloration upon use. They will consequently be suitable for use in, for example, greases disinfectant sprays, flotation processes, etc., for which purposes the dark-colored products heretofore known cannot be readily sold.

Where it is desired to use sulphurized organic compounds in paints, varnishes, etc., the color of the products in accordance with this invention may be still further improved by refining them in accordance with the method disclosed in my copending application for Letters Patent, Serial No. 723,330 filed May 1, 1934.

What I claim and desire to protect by Letters Patent is:

1. A method for the production of sulphurized products which includes reacting a compound selected from the group consisting of terpene and abietyl compounds with sulphur in the absence of an oxidizing material at a temperature of from about 80° C. to about 200° C.

2. A method for the production of sulphurized products which includes reacting a compound selected from the group consisting of terpene and abietyl compounds with sulphur in the absence of air at a temperature of from about 80° C. to about 200° C.

3. A method for the production of sulphurized terpenes which includes reacting a terpene and sulphur in the absence of an oxidizing material at a temperature of from about 80° C. to about 200° C.

4. A method for the production of sulphurized terpenes which includes reacting a terpene and sulphur in the absence of air at a temperature of from about 80° C. to about 200° C.

5. A method for the production of sulphurized abietyl compounds which includes reacting an abietyl compound and sulphur in the absence of an oxidizing material at a temperature of from about 80° C. to about 200° C.

6. A method for the production of sulphurized abietyl compounds which includes reacting an abietyl compound and sulphur in the absence of air at a temperature of from about 80° C. to about 200° C.

7. A method for the production of sulphurized products which includes treating a compound selected from the group consisting of terpene and abietyl compounds for the removal of oxidized components therefrom and then reacting the treated compound with sulphur in the absence of an oxidizing material at a temperature of from about 80° C. to about 200° C.

8. A method for the production of sulphurized products which includes treating a compound selected from the group consisting of terpene and abietyl compounds for the removal of oxidized components therefrom and then reacting the treated compound with sulphur in the absence of air at a temperature of from about 80° to about 200° C.

9. A method for the production of sulphurized terpenes which includes treating a terpene for the removal of oxidized components therefrom and then reacting the treated terpene with sulphur in the absence of an oxidizing material at a temperature of from about 80° C. to about 200° C.

10. A method for the production of sulphurized terpenes which includes treating a terpene for the removal of oxidized components therefrom and then reacting the treated terpene with sulphur in the absence of air at a temperature of from about 80° C. to about 200° C.

11. A method for the production of sulphurized abietyl compounds which includes treating an abietyl compound for the removal of oxidized components therefrom and then reacting the treated abietyl compound with sulphur in the absence of an oxidizing material at a temperature of from about 80° C. to about 200° C.

12. A method for the production of sulphurized abietyl compounds which includes treating an abietyl compound for the removal of oxidized components therefrom and then reacting the treated abietyl compound with sulphur in the absence of air at a temperature of from about 80° C. to about 200° C.

13. A method for the production of sulphurized products which includes washing a compound selected from the group consisting of terpene and abietyl compounds with an aqueous caustic solution for the removal of oxidized components therefrom and then reacting the treated compound with sulphur in the absence of an oxidizing material at a temperature of from about 80° C. to about 200° C.

14. A method for the production of sulphurized products which includes distilling a compound selected from the group consisting of terpene and abietyl compounds for the removal of oxidized components therefrom and then reacting the treated compound with sulphur in the absence of an oxidizing material at a temperature of from about 80° C. to about 200° C.

15. A method for the production of sulphurized products which includes steam distilling a compound selected from the group consisting of terpene and abietyl compounds for the removal of oxidized components therefrom and then reacting the treated compound with sulphur in the absence of an oxidizing material at a temperature of from about 80° C. to about 200° C.

16. A method for the production of sulphurized products which includes distilling a compound selected from the group consisting of terpene and abietyl compounds from caustic for the removal of oxidized components therefrom and then reacting the treated compound with sulphur in the absence of an oxidizing material at a temperature of from about 80° C. to about 200° C.

17. A method for the production of sulphurized products which includes washing a compound selected from the group consisting of terpene and abietyl compounds with an aqueous caustic solution, distilling the washed compound, and then reacting the treated compound with sulphur in the absence of an oxidizing material at a temperature of from about 80° C. to about 200° C.

18. A method for the production of sulphurized products which includes reacting a compound selected from the group consisting of terpene and abietyl compounds with sulphur in an atmosphere of inert gas at a temperature of from about 80° C. to about 200° C.

19. A method for the production of sulphurized products which includes reacting a compound selected from the group consisting of terpene and abietyl compounds with sulphur in an atmosphere of carbon dioxide at a temperature of from about 80° C. to about 200° C.

20. A method for the production of sulphurized turpentine oil, which includes reacting turpentine oil and sulphur in the absence of air at a temperature from about 80° C. to about 200° C.

21. A method for the production of sulphurized pine oil, which includes reacting pine oil and sulphur in the absence of air at a temperature from about 80° C. to about 200° C.

22. A method for the production of sulphurized diterpene, which includes reacting a diterpene and sulphur in the absence of air at a temperature from about 80° C. to about 200° C.

JOSEPH N. BORGLIN.

DISCLAIMER 2,111,882.—*Joseph N. Borglin*, Wilmington, Del. METHOD OF SULPHURIZING TERPENES, ABIETYL COMPOUNDS, ETC. Patent dated March 22, 1938. Disclaimer filed October 31, 1942, by the assignee, *Hercules Powder Company*.
Hereby enters this disclaimer to claims 1, 2, 3, 4, 18, 19, and 20 in said patent.
[*Official Gazette November 24, 1942.*]

treated abietyl compound with sulphur in the absence of air at a temperature of from about 80° C. to about 200° C.

13. A method for the production of sulphurized products which includes washing a compound selected from the group consisting of terpene and abietyl compounds with an aqueous caustic solution for the removal of oxidized components therefrom and then reacting the treated compound with sulphur in the absence of an oxidizing material at a temperature of from about 80° C. to about 200° C.

14. A method for the production of sulphurized products which includes distilling a compound selected from the group consisting of terpene and abietyl compounds for the removal of oxidized components therefrom and then reacting the treated compound with sulphur in the absence of an oxidizing material at a temperature of from about 80° C. to about 200° C.

15. A method for the production of sulphurized products which includes steam distilling a compound selected from the group consisting of terpene and abietyl compounds for the removal of oxidized components therefrom and then reacting the treated compound with sulphur in the absence of an oxidizing material at a temperature of from about 80° C. to about 200° C.

16. A method for the production of sulphurized products which includes distilling a compound selected from the group consisting of terpene and abietyl compounds from caustic for the removal of oxidized components therefrom and then reacting the treated compound with sulphur in the absence of an oxidizing material at a temperature of from about 80° C. to about 200° C.

17. A method for the production of sulphurized products which includes washing a compound selected from the group consisting of terpene and abietyl compounds with an aqueous caustic solution, distilling the washed compound, and then reacting the treated compound with sulphur in the absence of an oxidizing material at a temperature of from about 80° C. to about 200° C.

18. A method for the production of sulphurized products which includes reacting a compound selected from the group consisting of terpene and abietyl compounds with sulphur in an atmosphere of inert gas at a temperature of from about 80° C. to about 200° C.

19. A method for the production of sulphurized products which includes reacting a compound selected from the group consisting of terpene and abietyl compounds with sulphur in an atmosphere of carbon dioxide at a temperature of from about 80° C. to about 200° C.

20. A method for the production of sulphurized turpentine oil, which includes reacting turpentine oil and sulphur in the absence of air at a temperature from about 80° C. to about 200° C.

21. A method for the production of sulphurized pine oil, which includes reacting pine oil and sulphur in the absence of air at a temperature from about 80° C. to about 200° C.

22. A method for the production of sulphurized diterpene, which includes reacting a diterpene and sulphur in the absence of air at a temperature from about 80° C. to about 200° C.

JOSEPH N. BORGLIN.

DISCLAIMER 2,111,882.—*Joseph N. Borglin*, Wilmington, Del. METHOD OF SULPHURIZING TERPENES, ABIETYL COMPOUNDS, ETC. Patent dated March 22, 1938. Disclaimer filed October 31, 1942, by the assignee, *Hercules Powder Company*.

Hereby enters this disclaimer to claims 1, 2, 3, 4, 18, 19, and 20 in said patent.

[*Official Gazette November 24, 1942.*]

DISCLAIMER 2,111,882.—*Joseph N. Borglin*, Wilmington, Del. METHOD OF SULPHURIZING TERPENES, ABIETYL COMPOUNDS, ETC. Patent dated March 22, 1938. Disclaimer filed October 31, 1942, by the assignee, *Hercules Powder Company*.

Hereby enters this disclaimer to claims 1, 2, 3, 4, 18, 19, and 20 in said patent.

[*Official Gazette November 24, 1942.*]